United States Patent
Mohit et al.

(10) Patent No.: US 10,380,554 B2
(45) Date of Patent: Aug. 13, 2019

(54) EXTRACTING DATA FROM EMAIL ATTACHMENTS

(75) Inventors: Sharma Mohit, Karnataka (IN); Reddy Narasimha, Karnataka (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 1092 days.

(21) Appl. No.: 13/527,625

(22) Filed: Jun. 20, 2012

(65) Prior Publication Data

US 2013/0346510 A1    Dec. 26, 2013

(51) Int. Cl.
*G06Q 10/10*    (2012.01)

(52) U.S. Cl.
CPC .................... *G06Q 10/107* (2013.01)

(58) Field of Classification Search
CPC ..................................................... G06Q 10/107
USPC .......... 709/201–206, 217–219, 232
See application file for complete search history.

(56) References Cited

U.S. PATENT DOCUMENTS

| | | | |
|---|---|---|---|
| 5,596,655 A | 1/1997 | Lopez | |
| 6,151,426 A | 11/2000 | Lee et al. | |
| 6,263,122 B1 | 7/2001 | Simske et al. | |
| 6,563,913 B1 * | 5/2003 | Kaghazian | 379/93.24 |
| 6,820,237 B1 * | 11/2004 | Abu-Hakima et al. | 715/210 |
| 7,027,463 B2 * | 4/2006 | Mathew et al. | 370/463 |
| 7,155,482 B2 * | 12/2006 | Shinohara et al. | 709/206 |
| 7,249,319 B1 * | 7/2007 | Payne et al. | 715/209 |
| 7,283,272 B2 * | 10/2007 | Johnson et al. | 358/1.15 |
| 7,418,654 B2 * | 8/2008 | Kondo et al. | 715/205 |
| 7,539,343 B2 | 5/2009 | Simske et al. | |
| 7,634,473 B2 | 12/2009 | Shibata et al. | |
| 7,809,615 B2 * | 10/2010 | Hui et al. | 705/34 |
| 8,166,368 B2 * | 4/2012 | Lastras-Montano et al. | 714/763 |
| 8,179,549 B1 * | 5/2012 | Evans | 358/1.15 |
| 8,375,022 B2 | 2/2013 | Balinsky et al. | |
| 2002/0156817 A1 * | 10/2002 | Lemus | 707/531 |

(Continued)

FOREIGN PATENT DOCUMENTS

| CN | 101620625 A | 1/2010 |
|---|---|---|
| EP | 0992934 A2 | 4/2000 |

(Continued)

OTHER PUBLICATIONS

Using tag to help keyword extractionon Li Zhao ; Lianhe Yang ; Xirong Ma Computer and Information Application (ICCIA), 2010 International Conference on.*

(Continued)

*Primary Examiner* — Cheikh T Ndiaye
*Assistant Examiner* — Melaku Y Habtemariam
(74) *Attorney, Agent, or Firm* — Fabian VanCott (57) ABSTRACT

A method of extracting data from email attachments comprising receiving an email in which the email comprises a data file attached thereto; receiving a keyword, in which the keyword describes at least a portion of the data file; and extracting from the data file portions of the data file that contain the keyword. A system for extracting an attachment from an email, the system comprising a server; a processor communicatively coupled with the server; a memory communicatively coupled to the server; and an application stored within the memory; in which the system receives an email comprising a data file, and with a keyword, extracts from the data file portions of the data file that contain the keyword.

20 Claims, 7 Drawing Sheets

(56) References Cited

U.S. PATENT DOCUMENTS

| | | | |
|---|---|---|---|
| 2003/0187939 A1* | 10/2003 | O'Brien | 709/206 |
| 2003/0217107 A1* | 11/2003 | Parry | 709/206 |
| 2004/0015775 A1 | 1/2004 | Burns et al. | |
| 2004/0017941 A1 | 1/2004 | Simske | |
| 2004/0037470 A1 | 2/2004 | Simske | |
| 2004/0133560 A1 | 7/2004 | Simske | |
| 2006/0206806 A1 | 9/2006 | Han et al. | |
| 2007/0041668 A1* | 2/2007 | Todaka | 382/306 |
| 2007/0083598 A1* | 4/2007 | Kawakami | G06Q 10/107 709/206 |
| 2008/0177740 A1 | 7/2008 | Novak | |
| 2008/0294609 A1 | 11/2008 | Liu et al. | |
| 2010/0182632 A1* | 7/2010 | Wu et al. | 358/1.15 |
| 2011/0106892 A1* | 5/2011 | Nelson et al. | 709/206 |

FOREIGN PATENT DOCUMENTS

| | | |
|---|---|---|
| JP | H0232469 A | 2/1990 |
| JP | H09114834 A | 5/1997 |
| JP | 2006277413 A | 10/2006 |
| WO | WO-0113279 A2 | 2/2001 |

OTHER PUBLICATIONS

Mitchell, Tom M., et al. "Extracting Knowledge about Users' Activities from Raw Workstation." AAAI 2006. vol. 1. AAAI Press, 2006.*

Jackson, Thomas, and Sara Tedmori. "Capturing and managing electronic knowledge: the development of the email knowledge extraction (EKE) system." Innovations Through Information Technology (2004): 463-466.*

KIP Cloud Printing Operator Guide, 2011, pp. 1-26, Available at: <kipamerica.com/software/manuals/2011/KIP%20Cloud%20Printing%20Operator%20Guide.pdf>, KIP Group.

KIP Web App: Cloud Printing, 2011, pp. 1-10, Available at: <kip.com/pdf/webapps.pdf>, KIP Group.

UDOCX Scan Anywhere—Cloud Based Document Processing Service: Scan and Store Documents Directly to your SharePoint or Draft Folder, 2010-2011, pp. 1-3, Available at: <udocx.com/udocx-scan-anywhere-cloud-based-document-processing-service>, Fenestrae B.V.

Wikipedia, "tf-idf (term frequency—inverse document frequency," available Oct. 6, 2010, <http://web.archive.org/web/20101010035008/http://en.wikipedia.org/wiki/Tf%E2%80%93idf>.

Al-Hashemi, Rafeeq, "Text Summarization Extraction System (TSES) Using Extracted Keywords." International Arab Journal of e-Technology, 5 pages, Jun. 2010.

Hulth, Anette, "Enhancing Linguistically Oriented Automatic Keyword Extraction," Human Language Technology Conference, 4 pages, 2004.

International Preliminary Report on Patentability received for PCT Application No. PCT/US2006/028946, dated Mar. 6, 2008, 7 pages.

International Search Report and Written Opinion received for PCT Application No. PCT/US2006/028946, dated Aug. 1, 2007, 11 pages.

Matsuo et al., "Keyword Extraction from a Single Document Using Word Co-occurrence Statistical Information." International Journal on Artificial Intelligence Tools, 13 pages, 2003.

Tang, Y.Y. et al., "Automatic Document Processing: A Survey," Pattern Recognition, vol. 29, No. 12. pp. 1931-1952, 1996.

* cited by examiner

EXTRACTING DATA FROM EMAIL ATTACHMENTS

RELATED APPLICATIONS

Benefit is claimed under 35 U.S.C. 119(a)-(d) to Foreign application Serial No. 1671/CHE/2012 entitled "EXTRACTING DATA FROM EMAIL ATTACHMENTS" by Hewlett-Packard Development Company, L.P., filed on Apr. 28, 2012, which is herein incorporated in its entirety by reference for all purposes.

BACKGROUND

Email may provide a user of a computing device with the ability to transmit digital messages and other forms of information across a network such as the Internet. This information may be delivered digitally to another computing device. A user may choose to provide such information via text filed in the body of the email or as an attachment to the email. In order to use the information contained in an attachment, the attachment may be accessed and opened. The information contained with the attached document may then be viewed, printed, or otherwise manipulated by a user of the receiving computer.

BRIEF DESCRIPTION OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

As discussed above, email has become a convenient method of transferring information from one computer user to another. Often, attachments are sent along with the body of the text that contain additional information for the recipient to view. This additional information come in various file types such as .pdf, .wrd, .xls, .cad, .wpd, or other file types. The documents associated with these file types are searchable. However, when transferred by one person to another as an email attachment, the recipient may be asked to open the file and print off those pages that the recipient is to print off. Because of these extra steps, the recipient of the email may not want to print any portion of the document at all.

The present application, however, provides for a system that allows a sender of an email to have portions of the email attachment printed for the recipient. Specifically, the system may use a keyword provided by the sender to search the attached document and cause those portions of the attachment to be printed off that the sender would wish the recipient to review.

Therefore, in the present application and in the appended claims, the term sender is meant to be understood as any person who, using a computing device, sends an email to an intended recipient. Therefore, in one example, the sender may be an operator of, for example, a smart phone device, a tablet device, a desktop computing device, a laptop device, or any other similar computing device. Additionally, the computing device may be any type of device that has, at least, the functionality of sending an email with an attachment to a recipient.

Additionally, in the present application and in the appended claim, the term attachment is meant to be understood broadly as any computer file capable of being sent along with an email message. As discussed above, an attachment may be any file type including, but not limited to, .pub, .doc, .dot, .bmp, .ppt, . xls, .cad, .wpd, .pdf, or any other file type.

Still further, in the present application and in the appended claims, the term "keyword" is meant to be understood broadly as any word, character, or identifier which may be used by an application and processor to search among an attachment in an email. Therefore, in one example, the keyword may be used by the application and processor to select portions of a document to print out while other portions not containing or associated with the keyword are not printed out. In one example, the keyword may be a number of alphanumeric characters. In another example, the keyword may comprise a number of wildcard characters meant by the user to be used to substitute for any of a defined subset of all possible characters. For example, if the user wishes to have any portion of the data file containing the word "profit" and would also like any variant of that word searched for, the user may implement a wildcard to denote this. In this example, the user may then use a "*" for example at the end of the word (i.e. "profit*"). In this way a search may be conducted within the data file for any word beginning with the letters "profit." Similarly, the system may search for past, present, and future tenses of the word (i.e. profited, profiting, profit) such that the portions of the data file containing these terms may be printed as well.

Even further, in the present application and in the appended claims, the term "portion" is meant to be understood broadly as any portion of typed text or image that contains the keyword. Therefore, for example, if the attachment was a Microsoft® Word® document and the keyword was "memristor" those pages within the document containing that keyword will be printed off while other pages not containing that keyword will not. In another example, if the attachment was a Microsoft® Word® document and the keyword was "memristor" those paragraphs containing that keyword will be printed off while other paragraphs not containing that keyword will not. As will be discussed in more detail, the file types and keywords associated with the attachment as well as the portions of text or images that will be printed off may vary.

Still further, in the present application and in the appended claims the term "cloud computing system" is meant to be understood broadly as any number of physical computing systems operating on a network to provide processing resources to a client system connected to the network. In one example, the implementation of the hardware performing the processing of the applications is abstracted to the user and therefore the user may not know exactly from which server and which memory device associated with that server, his or her services are originating from.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language indicates that a particular feature, structure, or characteristic described in connection with that example is included as described, but may not be included in other examples.

Figure 1:
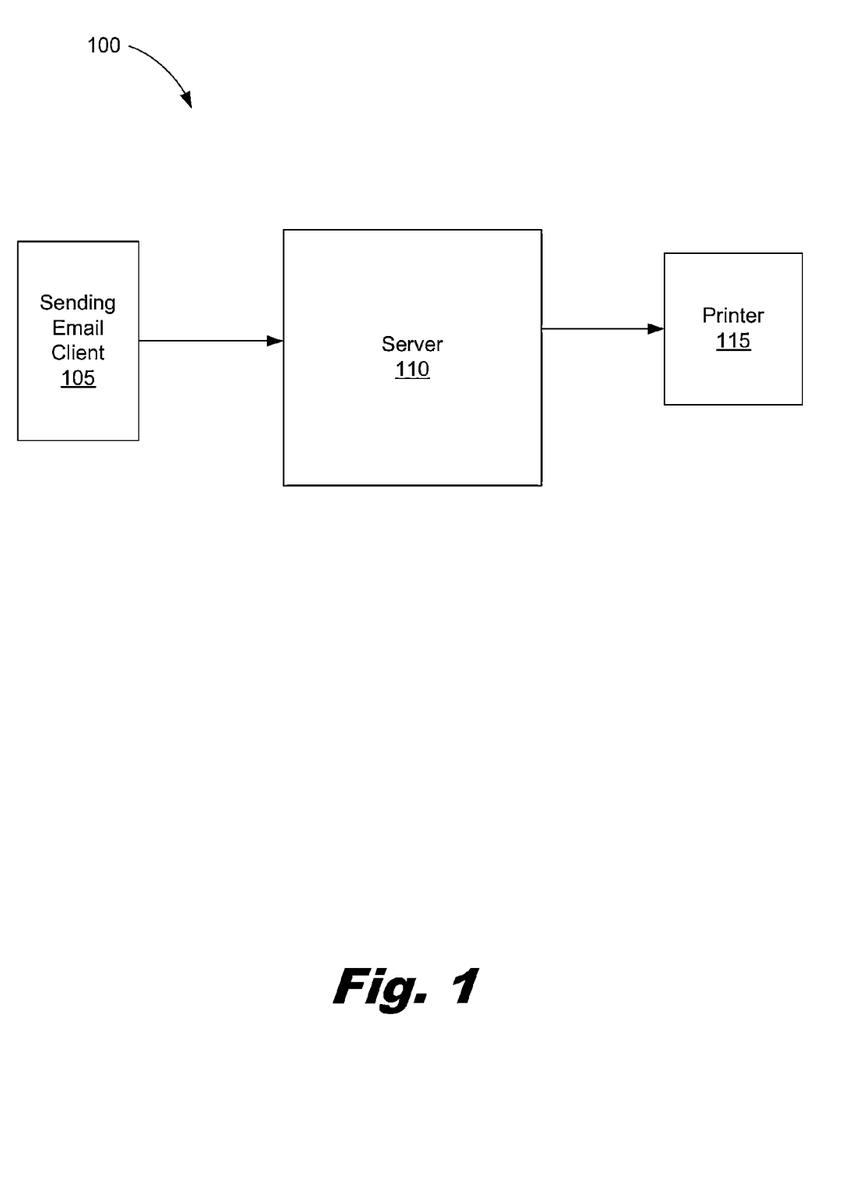
FIG. 1 is a block diagram of a system for sending an email and an attachment to another user according to one example of principles described herein.

FIG. 1 is a block diagram of a system (100) for sending an email attachment to another user according to one example of principles described herein. The system (100) may include a sending email client (105), a server (110), and a printer (115). In operation, the sending email client (105) may send, via a computer network connection, an email to a printer (115) through the server (110). The server (110) may then directly send, via another computer network connection, the material to a printer (115) associated with an intended recipient. In one example, the printer (115) may have an email address associated with it. Therefore, the sending email client (105) may direct the email to a specific printer having an associated email address. As will be discussed further below, the server may receive or intercept the email, open the attachment, and, using the keyword, cause the printer to print off those portions of the attachment associated with that keyword. The server (110) may send the data to the printer (115) in a form that is understandable by the printer (115). Some examples of forms of data that are understandable by the printer (115) may be PCL, PostScript, PDF, XPS, HP-GL, among others.

The printer (115) may by any printer capable of receiving data to be printed. In one example, the printer (115) may be preregistered with the server so as to receive an email identification. In one example, the email identification may be an email address which is associated with that specific printer. Therefore, the server (110) may further comprise a data storage device which contains a look-up table with all of the registered printers (115) and their associated email addresses. Therefore, when an email is received by the server (110), after, before, or while the server (110) is extracting from the data file those portions of the data file that contain the keyword, the server (110) may identify the recipient email address in the received email and look-up on the look-up table which printer (115) the extracted portions are to be sent to for printing.

The material to be printed is further defined by the keyword provided by the sender. Therefore, before the sender sends the email and attachment to the recipient, the sender may further define a keyword which may be used by the server (110) to extract only those portions of the attachment the sender intends to be printed off. As will be discussed in more detail below, if the attachment was a relatively lengthy document and the sender intends for the recipient to review only a portion of that document, the sender may specifically use a keyword as a way to reduce the time and effort by the recipient to review those portions. Additionally, this may reduce the amount of paper used; paper which may be thrown away by the recipient otherwise.

Figure 2:
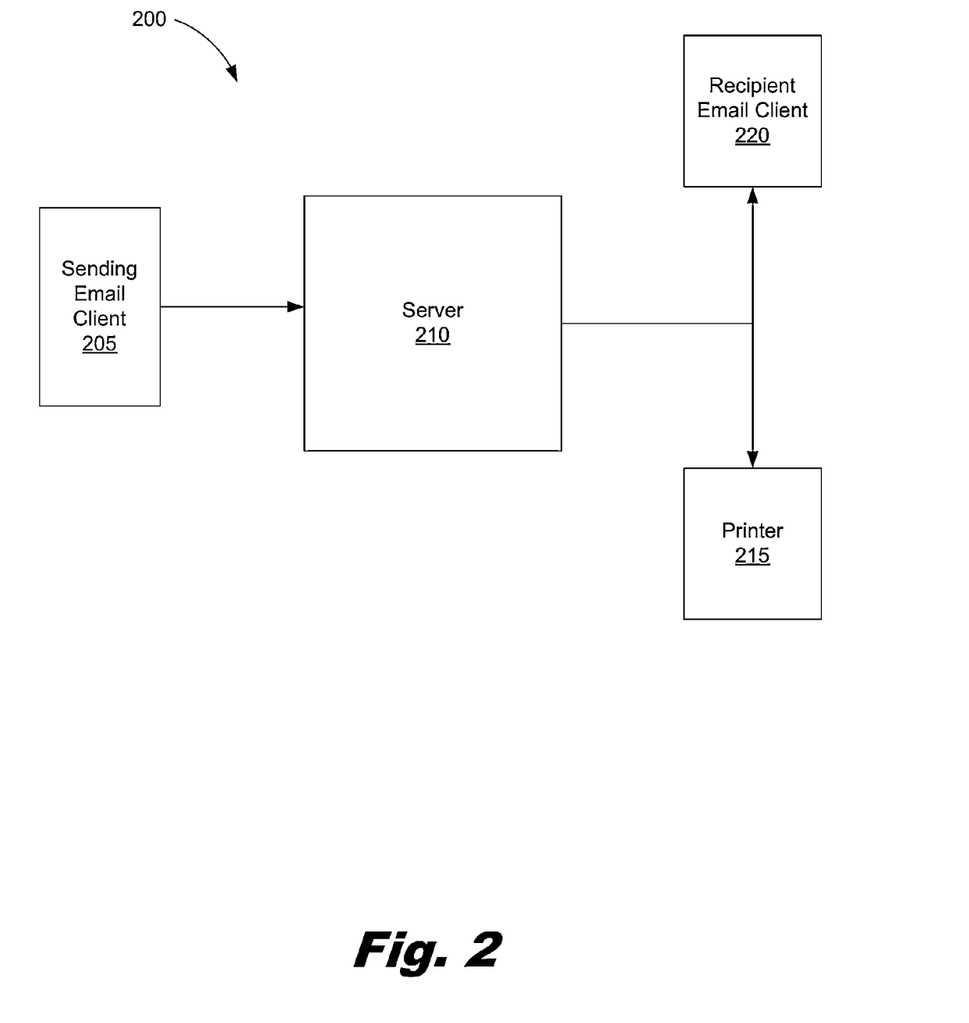
FIG. 2 is a block diagram of a system for sending an email and an attachment to a recipient email client according to another example of principles described herein.

In another example, the entire email and attachment may be sent to the recipient's email account for viewing in addition to the server forwarding to the printer (115) the portions of the document to be printed. FIG. 2 represents such an example. FIG. 2 is a block diagram of a system (200) for sending an email and an attachment to a recipient email client (220) according to another example of principles described herein. In this example, the sending email client (205) may receive both the email with its accompanying attachment, as well as receive a hard copy of those portions of the document the sender intended for the recipient to review or view. In this example, a look-up table may be used to associate a recipient's email address with a printer's email address.

As will be discussed below, the sending email client (FIG. 1, 105 and FIG. 2, 205) may comprise a processor and computer code which, when executed by the processor, will cause an email, attachment, and keyword to be sent to the server (FIG. 1, 110, FIG. 2, 210). The sending email client (FIG. 1, 105 and FIG. 2, 205) may also comprise a graphical user interface which may allow a user to compose an email complete with the attachment and keyword. The features of this user interface will be explained in more detail below in connection with FIG. 7.

Again, those portions of the attachment to be printed off are further defined by the keyword provided by the sending email client (205). Therefore, before the sending email client (205) sends the email and attachment to the printer (215) or recipient email client (220), the sending email client (205) may further define a keyword which may be used by the server (210) to extract those portions of the attachment the sending email client (205) intends to be printed off. Similar benefits may also be realized as those discussed in connection with FIG. 1 above.

Figure 3:
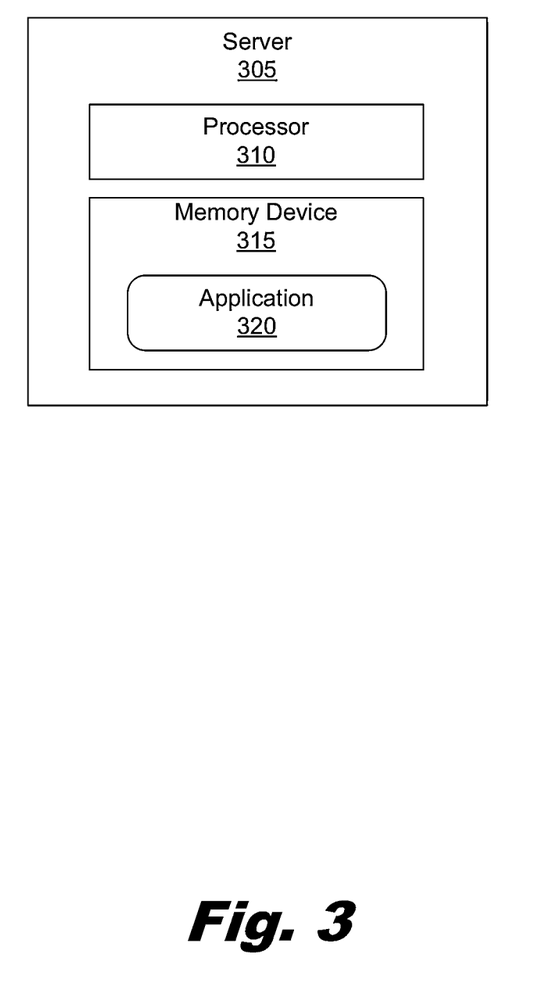
FIG. 3 is a block diagram showing a server that may be used within the system of FIGS. 1 and 2 according to one example of the principles described herein.

Turning now to FIG. 3, a block diagram showing a server (305) that may be used within the systems (100, 200) of FIGS. 1 and 2 is shown according to one example of the principles described herein. The server (305) may include a processor (310), a memory device (315), and an application (320). The server (305) may be any computing device intermediate between the sending email client (FIG. 1, 105 and FIG. 2, 205) and the printer (FIG. 1, 115 and FIG. 2, 215) or the recipient email client (FIG. 2, 220). The server (305) may therefore intercept the email being sent to the recipient email client (FIG. 2, 220) and, with the assistance of the processor (310), the memory device (315), and the application (320), cause the attachment associated with the sent email to be opened and searched based on a keyword provided by the sending email client (FIG. 1, 105 and FIG. 2, 205).

The processor (310) may be any processor (310) capable of receiving programming instructions and processing those instructions to, at least, receive an email from a sending email client (FIG. 1, 105 and FIG. 2, 205), remove an attachment associated with the email, search the attachment for a keyword provided b the sending email client (FIG. , 105 and FIG. 2, 205), and causing portions of the attachment to he printed off based upon that keyword. More specifically, the processor (310), upon receiving an email from a sending email client (FIG. 1, 105 and FIG. 2, 205), may execute those instructions associated with the application (320).

The application (320) may comprise program code which when executed by the processor (310) causes the processor (310) to review the email for any attachments associated with the email. If an attachment is found, the application may further comprise program code which directs the processor (310) to open the attachment. Additionally, the application may further comprise program code which directs the processor (310) to search the attachment for a keyword provided by the sending email client (FIG. 1, 105 and FIG. 2, 205). Once the processor has found a number of instances or occurrences of the keyword within the text or images of the attachment, the application may further comprise program code which directs the processor (310) to cause those portions of the text or images to be printed on a printer (FIG. 1, 115 and FIG. 2, 215).

The program code of the application (320) may be provided to the processor via any form of memory device (315). Therefore, the application may be stored on a hard disk drive (HDD), flash memory, random access memory (RAM), read only memory (ROM), or any other type of volatile or non-volatile memory device.

In one example, the computer readable code which defines the application may be in the form of a computer program product. The computer program product may comprise a computer readable storage medium having computer usable program code embodied therewith. The computer usable program code may comprise computer usable program code that, when executed by a processor, search an email for an attachment. The computer usable program code may further comprise computer usable program code that, when executed by a processor, open an attachment associated with a received email. Still further, the computer usable program code may comprise computer usable program code that, when executed by a processor, search an attachment for instances of a keyword within the attachment which was provided by a sending email client (FIG. 1, 105 and FIG. 2, 205). Even further, the computer usable program code may comprise computer usable program code that, when executed by a processor, cause those portions of the attachment which contain the keyword to be printed off on a printer.

In one example, the server (305) may be implemented in a cloud computing environment. Specifically, the server (305) may be part of a network of computing systems that are connected to each other through a network such as the Internet, an internet, or an intranet. In this example, the server (305) may at least be in electrical communication with a number of hardware devices to accomplish the functionality of receiving an email with an associated data file and keyword, opening the data file, and searching the data file for the keyword. The server may also be in electrical communication with a printer (FIG. 1, 115 and FIG. 2, 215) such that it may cause the printer (FIG. 1, 115 and FIG. 2, 215) to print off the portions of the data file which contain the keyword. Therefore, unlike FIG. 3 described above, the server (305) may comprise, for example, a processor (310) but may access the memory device (315) which is storing the application data (320) from another server or memory device to which it is connected. An example of such a cloud computing device is the HP® ePrint center® developed by Hewlett-Packard Development Company, L.P.

Figure 4:
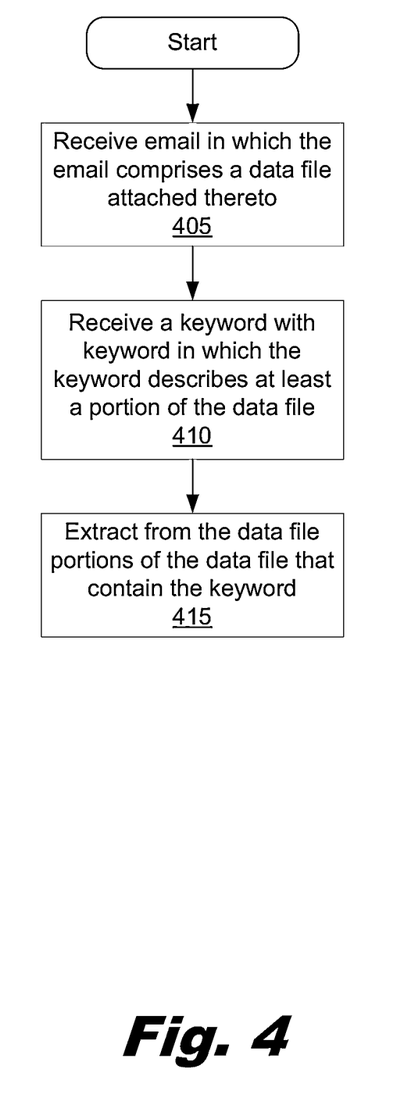
FIG. 4 is a flowchart describing a method of printing portions of an email attachment comprising a keyword according to one example of the principles described herein.

Turning now to FIG. 4, a flowchart describing a method of printing portions of an email attachment comprising a keyword is shown according to one example of the principles described herein. The method may begin with a server (FIG. 3, 305) receiving (block 405) an email in which the email comprises a data file attached thereto. The server may also receive (block 410) a keyword with the email in which the keyword describes at least a portion of the data file. The server may then extract (block 415), from the data file, portions of the data file that contain the keyword. The server may then send instructions to a printer to print off those portions of the data file that contain that keyword. The server may send these instructions to the printer through the use of an email address. In one example, the printer (FIG. 1, 115 and FIG. 2, 215) associated with the server (110, 210, 305) may be pre-registered with the server such that any user may access the printer to print off the document by entering in the email address associated with that printer when sending the email and attachment. In other examples, the printer (FIG. 1, 115 and FIG. 2, 215) may be accessed only by specific users. In this example, the server (110, 210, 305) will note the sender's email address and determine if the user is allowed to print off material on the printer (FIG. 1, 115 and FIG. 2, 215) associated with the recipient email address in the email.

Figure 5:
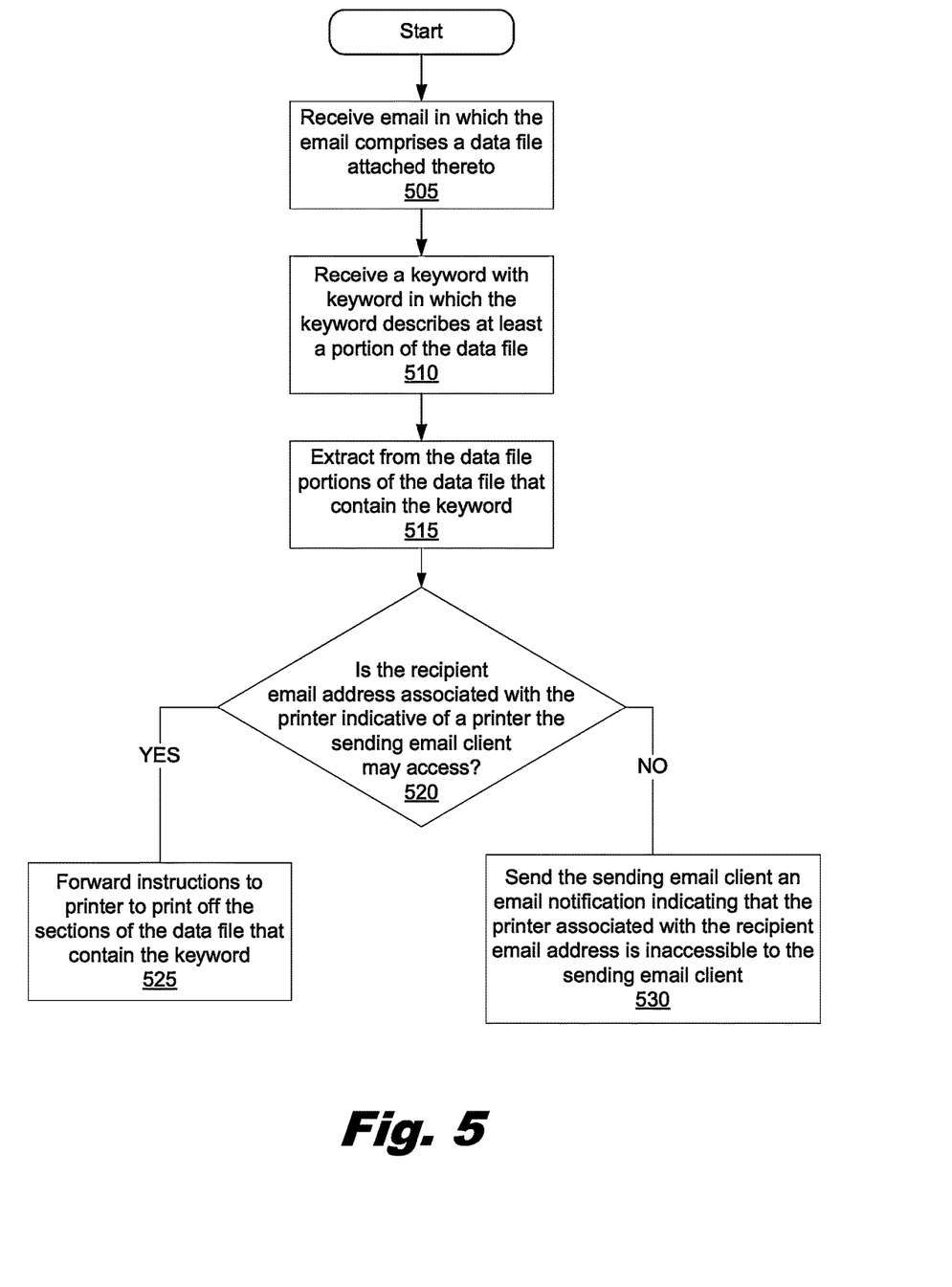
FIG. 5 is a flowchart describing another method of printing portions of an email attachment comprising a keyword according to one example of the principles described herein.

FIG. 5 is a flowchart describing another method of printing portions of an email attachment comprising a keyword according to one example of the principles described herein. Here, the method may begin with a server (FIG. 3, 305) receiving (block 505) an email in which the email comprises a data file attached thereto. The server may also receive (block 510) a keyword with the email in which the keyword describes at least a portion of the data file. The server may then extract (block 515), from the data file, portions of the data file that contain the keyword. The server may then determine (block 520) if the recipient email address associated with the printer is indicative of a printer the sending email client may access. In this example, a look-up table may be used to ascertain whether the email associated with the sending email client (FIG. 1, 105 and FIG. 2, 205) is indicative of a user associated with that address to access and use that printer (FIG. 1, 115 and FIG. 2, 215). If the sending email client's (FIG. 1, 105 and FIG. 2, 205) address is an address (YES determination, block 520) that may use the printer (FIG. 1, 115 and FIG. 2, 215), the server (FIG. 1, 110, FIG. 2, 210, and FIG. 3, 305) may forward (block 525) the instructions to the printer to print off the portions of the data file that contain the keyword. If the sending email client's (FIG. 1, 105 and FIG. 2, 205) address is not an address (NO determination, block 520) that may use the printer (FIG. 1, 115 and FIG. 2, 215), the server (FIG. 1, 110, FIG. 2, 210, and FIG. 3, 305) may or may not send the sending email client an email notification indicating that the printer associated with the recipient email address is inaccessible to the sending email client (FIG. 1, 105 and FIG. 2, 205). Specifically, the server (FIG. 1, 110, FIG. 2, 210, and FIG. 3, 305) may send such a notification depending on whether the printer (FIG. 1, 115 and FIG. 2, 215) is labeled as a "private" printer or a "public" printer.

For example, during the registration of the printer (FIG. 1, 115 and FIG. 2, 215) the registering user may indicate whether the printer (FIG. 1, 115 and FIG. 2, 215) is one to be used by a set of authorized users or whether the printer (FIG. 1, 115 and FIG. 2, 215) is to be used by anyone. In the former case, the user may indicate specifically who may be authorized to use the printer (FIG. 1, 115 and FIG. 2, 215) and thereby indicate that the printer (FIG. 1, 115 and FIG. 2, 215) is "private." If a non-authorized user has attempted to have the extracted portions of the data file printed to the printer (FIG. 1, 115 and FIG. 2, 215), then the server (FIG. 1, 110, FIG. 2, 210, and FIG. 3, 305) may simply disregard the request to print the information and not notify the sender.

Similarly, during registration of the printer (FIG. 1, 115 and FIG. 2, 215), the registering user may indicated that the printer (FIG. 1, 115 and FIG. 2, 215) is to be used by anyone thereby indicating that the printer (FIG. 1, 115 and FIG. 2, 215) is a "public" printer (FIG. 1, 115 and FIG. 2, 215). In this case, if a non-authorized user has attempted to have the extracted portions of the data file printed to the printer (FIG. 1, 115 and FIG. 2, 215), then the document may be printed at that printer (FIG. 1, 115 and FIG. 2, 215) and a notice may be sent to the user that it had been printed. Therefore, the user in this situation need only know the address of a public printer (FIG. 1, 115 and FIG. 2, 215) in order to have the portions printed.

In another example, the server (FIG. 1, 110, FIG. 2, 210, and FIG. 3, 305) may send to the sending email client an email notification indicating that the printer associated with the recipient email address is inaccessible to the sending email client (FIG. 1, 105 and FIG. 2, 205). This notification may be sent to the sending email client (FIG. 1, 105 and FIG. 2, 205) regardless of the public or private status of the printing device.

Figure 6:
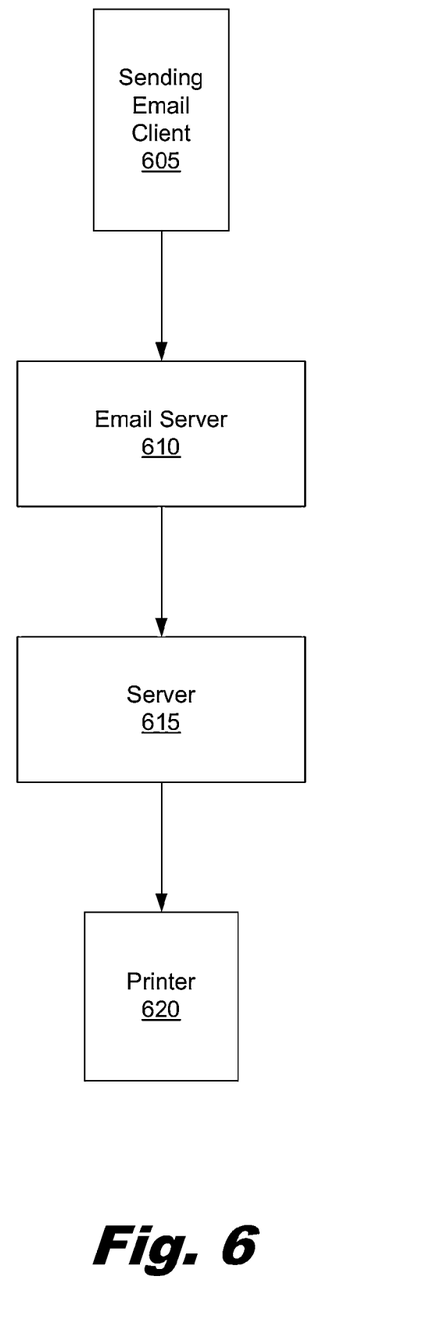
FIG. 6 is a block diagram of a system for sending an email and an attachment to a recipient email client according to another example of principles described herein.

Turning now to FIG. 6, a block diagram of a system for sending an email and an attachment to a recipient email client is shown according to another example of principles described herein. In this example, the sending email client 650 may direct an email and its attachment through an email server (610) before the email is received by the server (615). In this example, the sending email client (605) may use, for example, a corporate email server or other email service to direct the email to the server (615), This may provide the user with the ability to continue to use an already existing email service while taking advantage of, for example, a cloud computing system as described above. In this example, the user may be able to send a document to the server from any device and from any location. After the email has been routed to the server (615), the server (615) may forward those portions of the attachment to be printed off to the printer 620 as discussed above.

Figure 7:
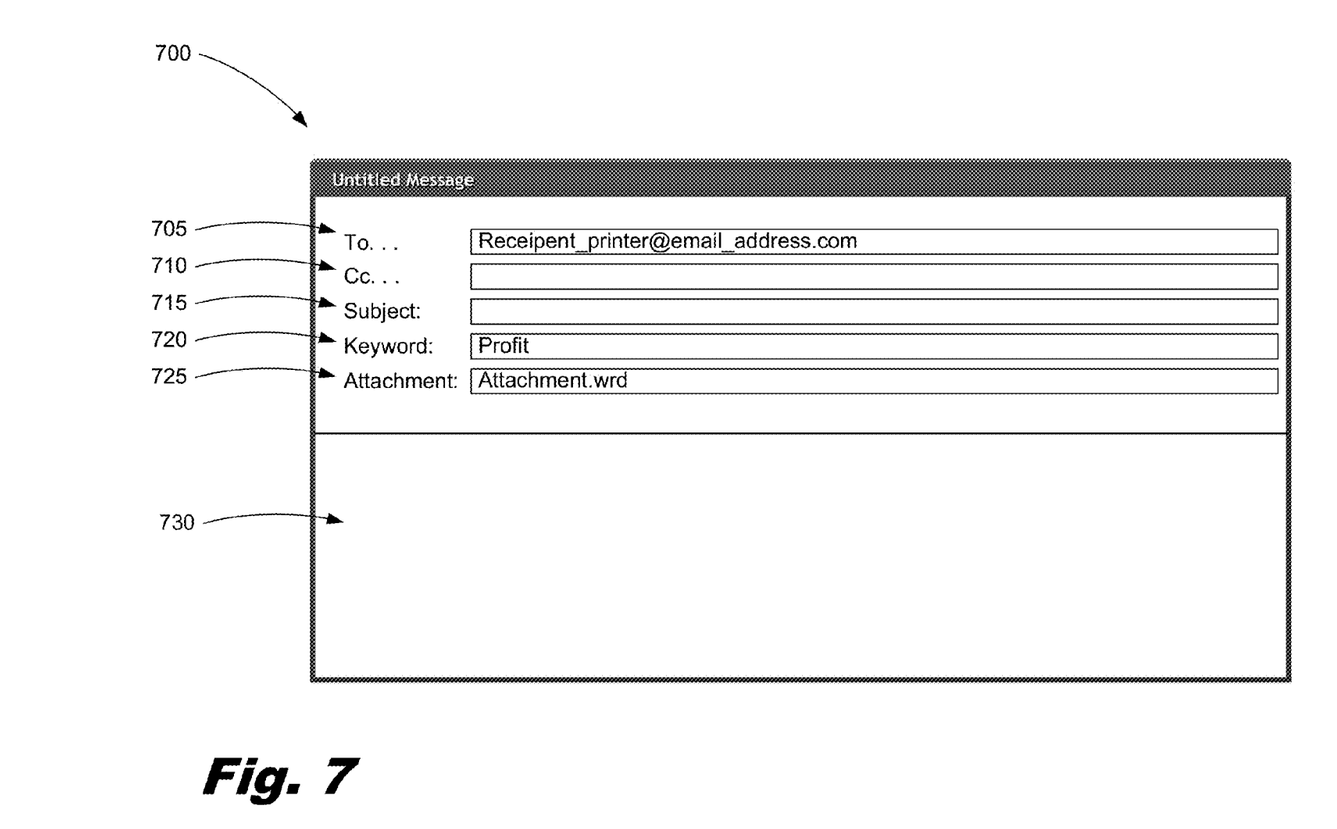
FIG. 7 is a screen shot of a graphical user interface of a sending email client according to an example of the principles described herein.

As discussed above, the sending email client (FIG. 1, 105 and FIG. 2, 205) may comprise a user interface. FIG. 7 is a screen shot of a graphical user interface of a sending email client according to an example of the principles described herein. The graphical user interface (700) may include various sections into which a user may add information. Specifically, the graphical user interface (700) may include a "To" section (705), a "Cc" section (710), a "Subject" section (715), a "Keyword" section (720), an "Attachment" section (725), and a body text section (730). The "To" section (705) may be used by the user to input an address of a printer (FIG. 1, 115 an FIG. 2, 215) at which the user intends the portions of the document to be printed.

A "Cc" section (710) may also be provide to allow the user of the graphical user interface (700) to carbon copy another recipient such as an owner of the printer (FIG. 1, 115 an FIG. 2, 215). The "Subject" section (715) may allow the user to enter in additional information so that a reader of the email may be made aware of the general subject of the email.

The graphical user interface (700) may also allow a user to enter in a keyword using the "Keyword" section (720). As discussed above, it is this keyword which the server (FIG. 1, 110 and FIG. 2, 210) uses to search the data file associated with the email for instances of the keyword. The keyword therefore is used to determine which portions of the data file or attachment are to be printed off on the printer. As discussed above, the keyword may be any character or series of characters and may further include special characters to indicate a wildcard character.

In one example, the keyword may be provided through the user typing in the "Keyword" section (720) of the email. In another example, the user may simply type within the text body (730) the string of characters which will be searched by the server (FIG. 1, 110 and FIG. 2, 210). In other examples, the keyword may be solicited from the user after the user has actuated a "send email" command.

Still further, the graphical user interface (700) may include a section in which an attachment or data file may be placed. The user of the graphical user interface (700) may therefore use the "Attachment" section (725) to attach a data file to the email. Even further, the graphical user interface (700) may include a body text section (730) which may be used by the user to input a message to another user. With these sections (705-730) the user may be allowed, through the user interface (700), to send an email, data file and keyword to a printer and cause that printer to print off portions of the data file which include the keyword.

The flowchart and block diagrams in the figures show the architecture, functionality, and operation of possible implementations of systems, methods and computer program products according to various examples of the present specification. In this regard, each block in the flowchart or block diagrams may represent a module, segment, or portion of code, which comprises a number of executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and flowchart illustrations, and combinations of blocks in the block diagrams and flowchart illustrations, can be implemented by special purpose hardware-based systems that perform the specified functions or acts, or combinations of special purpose hardware and computer instructions.

The specification and figures describe a system and method of extracting data from email attachments using a keyword. The keyword may describe a portion of the data within the data which the user intended to have printed off on a printing device associated with a specific email address. This system and method may have a number of advantages. Specifically, the user may be relieved of having to input any page numbers to be printed off. Additionally, there is no need for the user to search through the entire data file for those pages which contain the keyword or information he or she intends to have printed. Consequently, this saves time for the user. Having a knowledge of what information the data file contains, the user may simply enter in a keyword that appears in the section of data within the data file. The system does not require additional hardware such as a scanner to perform the search and the user does not have to be physically near the devices to print the material.

Additionally, while the user is away from any desktop or laptop computer, the user may send an email via a smartphone so as to accomplish the method described above thereby providing the user with modular flexibility. Even further, the user will not need to print off any additional and potentially unnecessary pages of the document. Consequently, this will provides benefits in operation costs as well as benefits to the environment.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of extracting data from email attachments comprising:
receiving, by a processor, an email in which the email comprises a data file attached thereto;
receiving, by the processor, with the email, a keyword from a sender of the email, in which the keyword describes at least a portion of the data file to be printed;
extracting, by the processor, from the data file portions of the data file that contain the keyword;
causing, by the processor, a printer to print the extracted data portions,
wherein the method provides for the sender of the email to identify, to a system of a recipient of the email and by the keyword sent with the email, the portions of the data file that the system is to print for the recipient.

2. The method of claim 1, further comprising sending, by the processor, the extracted portions to the printer to be printed.

3. The method of claim 2, in which the portions to be printed are pages of the data file that contain the keyword.

4. The method of claim 1, in which the keyword is part of the email.

5. The method of claim 1, in which the keyword is part of the subject field of the email.

6. The method of claim 1, in which the keyword is a character, a string of characters, or combinations thereof.

7. The method of claim 6, in which the keyword is comprised of a number of wildcard characters which are used to substitute any of a defined subset of all possible characters.

8. The method of claim 1 further comprising:
determining the email address of the sender of the email; and
determining if the email address associated with the sender of the email is an email address associated with a printer the sender of the email may have access to.

9. The method of claim 8, further comprising forwarding instructions to the printer to print those portions of the data file that contain the keyword if the email address associated with the sender of the email is an email address associated with a printer the sender of the email may have access to.

10. The method of claim 8, further comprising sending the sender of the email a notification indicating that the printer associated with the recipient email address is inaccessible to the sending email client if the email address associated with the sender of the email is not an email address associated with a printer the sender of the email may have access to.

11. The method of claim 1, further comprising sending the extracted portions to a printer email address for printing, wherein the printer email address is registered in association with the recipient email address.

12. The method of claim 11, further comprising determining whether a requesting user is authorized to print material on the printer associated with the printer email address.

13. A system for extracting an attachment from an email, the system comprising:
a processor;
a memory communicatively coupled to the processor; and an application stored within the memory;
in which the application receives an email comprising a data file, and with a keyword received with the email from a sender of the email, extracts from the data file portions of the data file that contain the keyword and that are to be printed, and prints the extracted data portions,
wherein the system provides for the sender of the email to identify, to the system of a recipient of the email and by the keyword sent with the email, the portions of the data file that the system is to print for the recipient.

14. The system of claim 13, in which the keyword is a character, a string of characters, or combinations thereof.

15. The system of claim 14, in which the keyword is comprised of a number of wildcard characters which are used to substitute any of a defined subset of all possible characters.

16. The system of claim 13, in which the keyword is received by the server with the sent email.

17. The system of claim 13, in which the server causes the extracted portions of the data file that contain the keyword to be printed on a printer.

18. The system of claim 17, in which the email comprises a recipient email address associated with a specific printer and in which the extracted portions of the data file that contain the keyword are sent to the specific printer associated with that recipient email address.

19. A computer program product for extracting data from an email attachment, the computer program product comprising:
a computer readable storage device having computer usable program code embodied therewith, the computer usable program code comprising:
computer usable program code to, when executed by a processor, register a printer email address that is associated with a recipient email address, the printer email address indicating a printer where messages to the recipient user email address are printed;
computer usable program code to, when executed by a processor, receive an email in which the email comprises a sender email address, a recipient email address, and a data file attached thereto;
computer usable program code to, when executed by a processor, receive a keyword with the email from a sender of the email, in which the keyword describes at least a portion of the data file to be printed;
computer usable program code to, when executed by a processor, extract from the data file portions of the data file that contain the keyword; and
computer usable program code to, when executed by a processor, send the extracted portions to the printer email address for printing,
wherein the computer usable program code provides for the sender of the email to identify, to a system of a recipient of the email and by the keyword sent with the email, the portions of the data file that the system is to print for the recipient.

20. The computer program product of claim 19, further comprising computer usable program code to, when executed by a processor, determine whether the sender email address is authorized to print material on the printer associated with the printer email address prior to sending the extracted portions to the printer email address for printing.

* * * * *